(12) United States Patent
Karr et al.

(10) Patent No.: US 7,669,032 B2
(45) Date of Patent: Feb. 23, 2010

(54) HOST-BASED VIRTUALIZATION OPTIMIZATIONS IN STORAGE ENVIRONMENTS EMPLOYING OFF-HOST STORAGE VIRTUALIZATION

(75) Inventors: Ronald S. Karr, Palo Alto, CA (US); Angshuman Bezbaruah, Pune (IN); Amitava Guha, San Jose, CA (US)

(73) Assignee: Symantec Operating Corporation, Mountain View, CA (US)

( * ) Notice: Subject to any disclaimer, the term of this patent is extended or adjusted under 35 U.S.C. 154(b) by 180 days.

(21) Appl. No.: 11/156,820

(22) Filed: Jun. 20, 2005

(65) Prior Publication Data

US 2006/0112251 A1 May 25, 2006

Related U.S. Application Data

(63) Continuation-in-part of application No. 10/722,614, filed on Nov. 26, 2003, and a continuation-in-part of application No. PCT/US2004/039306, filed on Nov. 22, 2004.

(51) Int. Cl.
*G06F 12/00* (2006.01)
*G06F 13/00* (2006.01)
*G06F 13/28* (2006.01)
(52) U.S. Cl. ..................... 711/203; 711/202
(58) Field of Classification Search ............ 711/6, 711/203, 114, 202
See application file for complete search history.

(56) References Cited

U.S. PATENT DOCUMENTS

| | | | |
|---|---|---|---|
| 5,249,279 A * | 9/1993 | Schmenk et al. | 710/5 |
| 6,449,705 B1 * | 9/2002 | Peloquin et al. | 711/173 |
| 6,467,023 B1 | 10/2002 | Dekoning | |
| 6,816,917 B2 | 11/2004 | Fleming | |
| 7,082,503 B2 | 7/2006 | Ito | |
| 7,100,089 B1 * | 8/2006 | Phelps | 714/42 |
| 7,188,194 B1 | 3/2007 | Kuik | |
| 2002/0087751 A1 * | 7/2002 | Chong, Jr. | 710/33 |
| 2002/0156984 A1 * | 10/2002 | Padovano | 711/148 |
| 2003/0131182 A1 * | 7/2003 | Kumar et al. | 711/5 |
| 2003/0140193 A1 * | 7/2003 | Acharya et al. | 711/112 |
| 2003/0177330 A1 * | 9/2003 | Idei et al. | 711/202 |
| 2003/0204597 A1 * | 10/2003 | Arakawa et al. | 709/226 |
| 2003/0236945 A1 * | 12/2003 | Nahum | 711/114 |
| 2004/0030822 A1 * | 2/2004 | Rajan et al. | 711/4 |

(Continued)

OTHER PUBLICATIONS

"Eternus6000 Storage Systems", Fujitsu Limited, Technical White Paper, May 2005.

*Primary Examiner*—Sheng-Jen Tsai
(74) *Attorney, Agent, or Firm*—Meyertons, Hood, Kivlin, Kowert, Goetzel, P.C.

(57) ABSTRACT

A system for host-based virtualization optimizations in storage environments employing off-host virtualization may include a host, one or more physical storage devices, and an off-host virtualizer such as a virtualizing switch. The off-host virtualizer may be configured to aggregate storage within the one or more physical storage devices into a virtual storage device such as a logical volume, and to provide control data for the virtual storage device to the host. The host may be configured to use the control data to perform a function in response to an I/O request from a storage consumer directed at the virtual storage device, and to use a result of the function to coordinate one or more I/O operations corresponding to the I/O request.

30 Claims, 10 Drawing Sheets

U.S. PATENT DOCUMENTS

| | | | |
|---|---|---|---|
| 2004/0103261 A1* | 5/2004 | Honda et al. | 711/202 |
| 2004/0151188 A1* | 8/2004 | Maveli et al. | 370/398 |
| 2005/0228937 A1* | 10/2005 | Karr et al. | 711/6 |
| 2005/0228950 A1 | 10/2005 | Karr | |
| 2005/0235132 A1 | 10/2005 | Karr | |
| 2006/0013222 A1* | 1/2006 | Rangan et al. | 370/389 |

* cited by examiner

HOST-BASED VIRTUALIZATION OPTIMIZATIONS IN STORAGE ENVIRONMENTS EMPLOYING OFF-HOST STORAGE VIRTUALIZATION

This application is a continuation-in-part of U.S. patent application Ser. No. 10/722,614, entitled "SYSTEM AND METHOD FOR EMULATING OPERATING SYSTEM METADATA TO PROVIDE CROSS-PLATFORM ACCESS TO STORAGE VOLUMES", filed Nov. 26, 2003, and is a continuation-in-part of Application Number PCT/US2004/039306 filed Nov. 22, 2004 in the PCT.

BACKGROUND OF THE INVENTION

1. Field of the Invention

This invention relates to computer systems and, more particularly, to storage environments employing off-host virtualization of storage devices.

2. Description of the Related Art

Many business organizations and governmental entities rely upon applications that access large amounts of data, often exceeding a terabyte of data, for mission-critical applications. Often such data is stored on many different storage devices, which may be heterogeneous in nature, including many different types of devices from many different manufacturers.

Configuring individual applications that consume data, or application server systems that host such applications, to recognize and directly interact with each different storage device that may possibly be encountered in a heterogeneous storage environment would be increasingly difficult as the environment scaled in size and complexity. Therefore, in some storage environments, specialized storage management software and hardware may be used to provide a more uniform storage model to storage consumers. Such software and hardware may also be configured to present physical storage devices as virtual storage devices to computer hosts, and to add storage features not present in individual storage devices to the storage model. For example, features to increase fault tolerance, such as data mirroring, snapshot/fixed image creation, or data parity, as well as features to increase data access performance, such as disk striping, may be implemented in the storage model via hardware or software. The added storage features may be referred to as storage virtualization features, and the software and/or hardware providing the virtual storage devices and the added storage features may be termed "virtualizers" or "virtualization controllers". Virtualization may be performed within computer hosts, such as within a volume manager layer of a storage software stack at the host, and/or in devices external to the host, such as virtualization switches or virtualization appliances. Such external devices providing virtualization may be termed "off-host" virtualizers. Off-host virtualizers may be connected to the external physical storage devices for which they provide virtualization functions via a variety of interconnects, such as Fiber Channel links, Internet Protocol (IP) networks, and the like.

In some storage environments employing virtualization, off-host virtualizers such as virtualization switches may be capable of performing certain virtualization-related functions, but may not be flexible enough to handle other virtualization-related functions efficiently. For example, if an I/O request from a host or storage consumer maps to blocks within two different back-end physical storage devices (e.g., if a write request may require blocks at two different back-end SCSI disk arrays to be updated), some virtualizing switches may serialize the back-end operations instead of performing them in parallel. If the I/O request were pre-partitioned into multiple I/O requests, such that each request was limited to a single back-end physical storage device, the switch may schedule the multiple I/O requests in parallel instead of serializing them. In addition, for certain types of I/O operations, where for example more than one network path from the host to a target storage device is available, the use of one path by the host may result in more efficient I/Os (e.g., by traversing fewer network hops or switches) than the use of other paths. Information on the multiple paths may be available from the off-host virtualizer. A mechanism that allows cooperation between off-host virtualizers and host-based virtualization software to optimize I/O operations may therefore be desirable.

SUMMARY

Various embodiments of a system and method for host-based virtualization optimizations in storage environments employing off-host virtualization are disclosed. According to a first embodiment, a system may include a host, one or more physical storage devices, and an off-host virtualizer which may include, for example, one or more virtualizing switches. The off-host virtualizer may be configured to aggregate storage within the one or more physical storage devices into a virtual storage device such as a logical volume, and to provide control data for the virtual storage device to the host. In various embodiments, the control data may be provided in-band (e.g., as part of a response to an I/O request) or out-of-band (e.g., in a message generated according to a custom I/O management protocol), or using a combination of in-band and out-of-band communication. The host may be configured to use the control data to perform a function in response to an I/O request from a storage consumer directed at the virtual storage device, and to use a result of the function to coordinate one or more I/O operations corresponding to the I/O request. The function performed by the host may result in a more efficient response to the I/O request (e.g., a faster response, or a response that requires fewer resources) than may have been possible if the function were not performed. Thus, the off-host virtualizer may be configured to cooperate with the host (e.g., with an optimization driver layer of a host software stack) to enhance the I/O efficiency of the system.

In one specific embodiment, the one or more physical storage devices may include a first and a second physical storage device. The control data provided by the off-host virtualizer may include a layout or geometry of the virtual storage device, allowing the host to identify the physical storage device or devices to which any given logical block of the virtual storage device is mapped. In such an embodiment, the host may be configured to detect whether a given I/O request from a storage consumer may require physical I/O at more than one physical storage device, e.g., at both the first and second storage devices. If physical I/Os at multiple physical storage devices are required, the host may be configured to partition the I/O request to multiple physical I/O requests, such that no single physical I/O request requires access to more than one physical storage device. The host may then send the partitioned physical I/O requests to the off-host virtualizer, thereby allowing the off-host virtualizer to complete the physical I/O requests without requiring I/O splitting at the off-host virtualizer.

In another embodiment, multiple network paths may be available from the host to a given physical storage device. The control data provided by the host may include network path information. The host may be configured to utilize the control data to select a preferred network path to use when accessing a given physical storage device. For example, if several virtualizing switches can provide services for the same virtual storage device that is backed by the given physical storage device, the host may select the switch that may be most efficient for each block and/or each physical I/O, based on a variety of I/O path characteristics and/or switch characteristics. The characteristics that may be used to select the preferred network path may include the number of network hops or switches included, the load at one or more devices or path links, or the specific performance and/or functional characteristics of the switches and/or host bus adapters included. In some embodiments, the host may be further configured to respond to a triggering condition such as a failure or a load imbalance by selecting a different preferred network path. The off-host virtualizer may be configured to provide a special error code to the host when a path failure is detected in such an embodiment, allowing the host to retry attempts to access a storage device, and/or to send subsequent I/O requests using an alternative network path.

Figure 1:
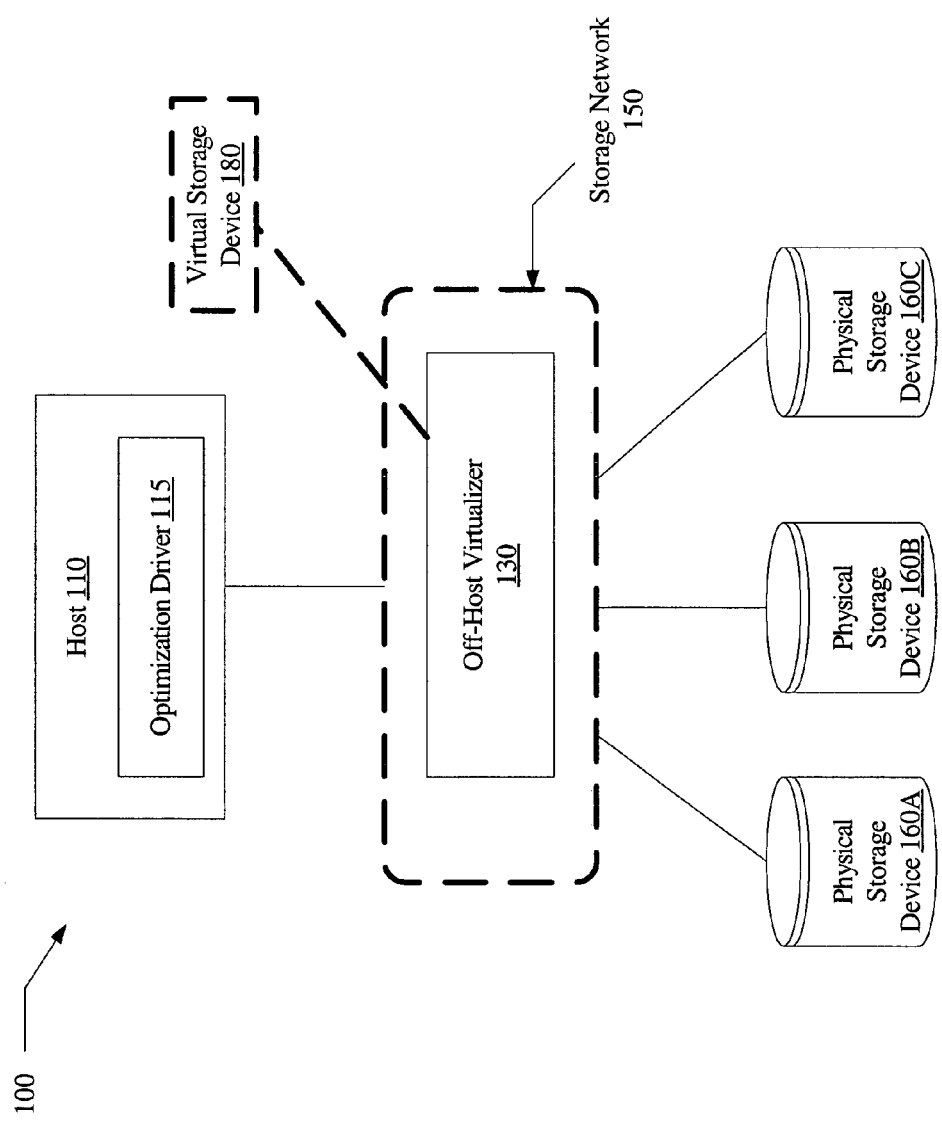
FIG. 1 is a block diagram illustrating one embodiment of a computer system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 is a block diagram illustrating a computer system 100 according to one embodiment. In the illustrated embodiment, system 100 includes a host 110, an off-host virtualizer 130, and physical storage devices 160A-160C (which may be collectively referred to herein as physical storage devices 160). Off-host virtualizer 130 may be comprised of one or more nodes (e.g., one or more virtualization switches) of a storage network 150 through which physical storage devices 160 may be accessed from host 110. Off-host virtualizer 130 may be configured to aggregate storage within physical storage devices 160 into a virtual storage device 180, and to provide control data for the virtual storage device 180 to an optimization driver 115 within host 110. In response to an I/O request directed at the virtual storage device 180 from a storage consumer such as a file system or a database management system, optimization driver 115 at host 110 may be configured to perform a function dependent on the control data, and to coordinate one or more I/O operations corresponding to the I/O request using a result of the function. The function performed by the optimization driver 115 may support a more efficient execution of the I/O operation or operations required to satisfy the I/O request than would have been possible if the function were not performed, as described below in further detail. Additional details on the virtualization features supported by off-host virtualizer 130 and the contents of the control data provided to host 110 in various embodiments are also provided below.

In one embodiment, physical storage devices 160 may include physical block devices. Generally speaking, a physical block device may comprise any hardware entity that provides a collection of linearly addressed data blocks that can be read or written. For example, in one embodiment a physical block device may be a single disk drive configured to present all of its sectors as an indexed array of blocks. In another embodiment, a set of individual disk drives may be organized as a single physical storage device in the form of a hardware disk array. A hardware disk array may present data from its constituent disk drives as a single contiguous storage address range to a storage consumer. It is contemplated that any suitable type of storage device may be configured (singly or as part of a collection or an array) as a physical block device, such as fixed or removable magnetic media drives (e.g., hard drives, floppy or Zip-based drives), writable or read-only optical media drives (e.g., CD or DVD), tape drives, solid-state mass storage devices, or any other type of storage device. Physical storage devices 160, such as disks or tape drives, may be accessible via some form of the Small Computer System Interface (SCSI) protocol, though other protocols and interfaces are possible and contemplated.

In the context of storage management, the term "virtualization" refers to a process of creating or aggregating logical or virtual storage devices out of one or more underlying physical or logical storage devices, and making the virtual storage devices accessible to consumers (which may be termed virtual device clients) for storage operations. When the underlying physical storage devices (which may be termed backing storage devices) and the aggregated virtual storage devices present a block interface (i.e., a collection of linearly addressable blocks), the process may be termed "block virtualization". For example, in one embodiment of block virtualization, one or more layers of software may rearrange blocks from one or more physical block devices, such as disks, and add various kinds of functions. The resulting rearranged collection of blocks may then be presented to a storage consumer, such as a database application or a file system, as one or more aggregated devices (such as logical volumes) with the appearance of one or more basic disk drives. That is, the more complex structure resulting from rearranging blocks and adding functionality may be presented as if it were one or more simple arrays of blocks, or logical block devices. In some embodiments, multiple layers of virtualization may be implemented. Thus, one or more block devices may be mapped into a particular virtualized block device, which may be in turn mapped into still another virtualized block device, allowing complex storage functions to be implemented with simple block devices.

Block virtualization may be implemented at various places within a storage environment, in both hardware and software. In host-based block virtualization, a volume manager, such as the VERITAS Volume Manager™ from VERITAS Software Corporation, may be implemented within a storage software stack at host 110. The volume manager may, for example, form a layer between a disk driver layer and a file system layer. In some storage environments, virtualization functionality may be added to host bus adapters (HBAs), i.e., to devices that provide an interface between the storage software stack at a host 110 and the storage network 150. Block virtualization may also be performed outside the host 110, e.g., in a virtualization appliance, a virtualizing switch, or at some other device dedicated to virtualization services. Such external devices providing block virtualization (i.e., devices that are not incorporated within host 110) may be termed off-host virtualizers 130 or off-host virtualization controllers. In some storage environments, block virtualization functionality may be implemented by an off-host virtualizer 130 in cooperation with a host-based virtualizer. That is, some block virtualization functionality may be performed off-host, and other block virtualization features may be implemented at the host. In addition, in some embodiments, multiple devices external to the host 110 may be configured to cooperate to provide block virtualization services; e.g., off-host virtualizer functionality may be distributed across a number of cooperating virtualizing switches, virtualizing appliances or a combination of virtualizing switches and appliances. Each of the various devices that collectively form the off-host virtualizer may be connected to the host by a separate path (e.g., a separate set of links) in some embodiments.

In various embodiments, off-host virtualizer 130 may implement numerous different types of storage functions using block virtualization. For example, in one embodiment a virtual block device such as a logical volume may implement device striping, where data blocks may be distributed among multiple physical or logical block devices, and/or device spanning, in which multiple physical or logical block devices may be joined to appear as a single large logical block device. In some embodiments, virtualized block devices may provide mirroring and other forms of redundant data storage, the ability to create a snapshot or point-in-time image of a particular block device at a point in time, and/or the ability to replicate data blocks among storage systems connected through a network such as a local area network (LAN) or a wide area network (WAN), for example. Additionally, in some embodiments virtualized block devices may implement certain performance optimizations, such as load distribution, and/or various capabilities for online reorganization of virtual device structure, such as online data migration between devices. In other embodiments, one or more block devices may be mapped into a particular virtualized block device, which may be in turn mapped into still another virtualized block device, allowing complex storage functions to be implemented with simple block devices. More than one virtualization feature, such as striping and mirroring, may thus be combined within a single virtual block device in some embodiments, creating a hierarchical virtual storage device.

In one embodiment, off-host virtualizer 130 may also be configured to present a virtual storage device in the form of a virtual SCSI LUN (logical unit) to a disk driver within a storage software stack at host 110. That is, off-host virtualizer 130 may be configured to emulate metadata within the virtual storage device in a manner that allows a disk driver at host 110 to detect or recognize the virtual storage device as a LUN. In addition, off-host virtualizer 130 may be configured to map one or more logical volumes to one or more respective address ranges within a virtual LUN (VLUN), and to provide configuration information for the logical volumes to the host (e.g., to a second driver, such as optimization driver 115, layered above the disk driver) accessing the VLUN to allow I/O operations to be performed on the logical volumes. Such a mapping of logical volumes to VLUNs may be termed "volume tunneling". The format and location of the emulated metadata within the VLUN may vary with the operating system in use at host 110, i.e., in an environment where multiple operating systems are supported, off-host virtualizer 130 may need to generate metadata according to a variety of different specifications.

The off-host virtualizer 130, either alone or in cooperation with one or more other virtualizers, may provide functions such as configuration management of virtualized block devices and distributed coordination of block device virtualization. For example, after a reconfiguration of a logical volume accessed from multiple hosts 110 (e.g., when the logical volume is expanded, or when a new mirror is added to the logical volume), the off-host virtualizer 130 may be configured to distribute a volume description indicating the reconfiguration to each of the multiple hosts. In one embodiment, once the volume description has been provided to the hosts 110, the hosts 110 may be configured to interact directly with various storage devices 160 according to the volume description (i.e., to transform logical I/O requests into physical I/O requests using the volume description). Distribution of a virtualized block device as a volume to one or more virtual device clients, such as hosts 110, may be referred to as distributed block virtualization.

In some embodiments, off-host virtualizer 130 may be configured to distribute all defined logical volumes to each virtual device client present within a system. Such embodiments may be referred to as symmetric distributed block virtualization systems. In other embodiments, specific volumes may be distributed only to respective virtual device clients, such that at least one volume is not common to two virtual device clients. Such embodiments may be referred to as asymmetric distributed block virtualization systems.

As noted above, in some embodiments off-host virtualizer 130 may include one or more virtualizing switches, such as intelligent fibre channel switches. In addition to providing the interconnection functionality provided by a standard switch device, a virtualization switch may typically include one or more ASICs (Application Specific Integrated Circuit) or other circuitry programmed to provide desired virtualization features. In some embodiments, a virtualization switch may include one or more memory modules in which virtualization-related data structures (such as volume layout information) may be stored. In one embodiment, a virtualizing switch may provide an application programming interface (API) to control aspects of the virtualization functionality provided, e.g., to load desired volume layout information from an external volume configuration database. The specific virtualization features supported, and the processing and/or memory capacity of a given virtualizing switch, may differ from one switch product to another, and from vendor to vendor. Some virtualization switches may be relatively inflexible in the virtualization features supported: for example, a switch may support mirroring, but may limit the maximum number of mirrors that a virtual storage device may include (e.g., to four mirrors). Typically, virtualizing switches may be designed to pass on I/O requests to back-end physical storage devices 160 as soon as possible after the I/O request is received, and similarly, to pass the results of I/O operations back to the requesting front-end client or host as soon as possible. That is, the switches may typically not be configured to store the data corresponding to an I/O request (e.g., the data blocks written or read), which may result in complicated error handling under some circumstances, as described below in further detail.

In many storage environments employing off-host virtualizers 130, especially when the off-host virtualizer includes virtualization switches with relatively limited processing and/or memory capabilities as described above, certain storage operations may be performed more efficiently if the off-host virtualizer 130 is configured to cooperate with optimization driver 115 at the host 110. The term "optimization driver", as used herein, refers to any software module or layer within a host 110 that is configured to receive control data for virtual storage device 180 from off-host virtualizer 130, to use the control data to perform a function or operation in response to an I/O request from a storage consumer, and to coordinate one or more I/O operations to complete a response to the I/O request using a result of the function. For example, the optimization driver may be a layer of software above a disk driver and below a file system within a storage software stack at host 110 in one embodiment. In another embodiment, the optimization driver may be incorporated within a volume manager. The I/O operations performed using the results of the function may result in the I/O request being satisfied in a more efficient manner (e.g., faster and/or with a lower level of resource utilization) than if the function had not been performed. In various embodiments, the control data may be provided to the host in-band (e.g., as part of a response to an I/O request) or out-of-band (e.g., in a message generated according to a custom I/O management protocol), or using a combination of in-band and out-of-band communication.

Figure 2:
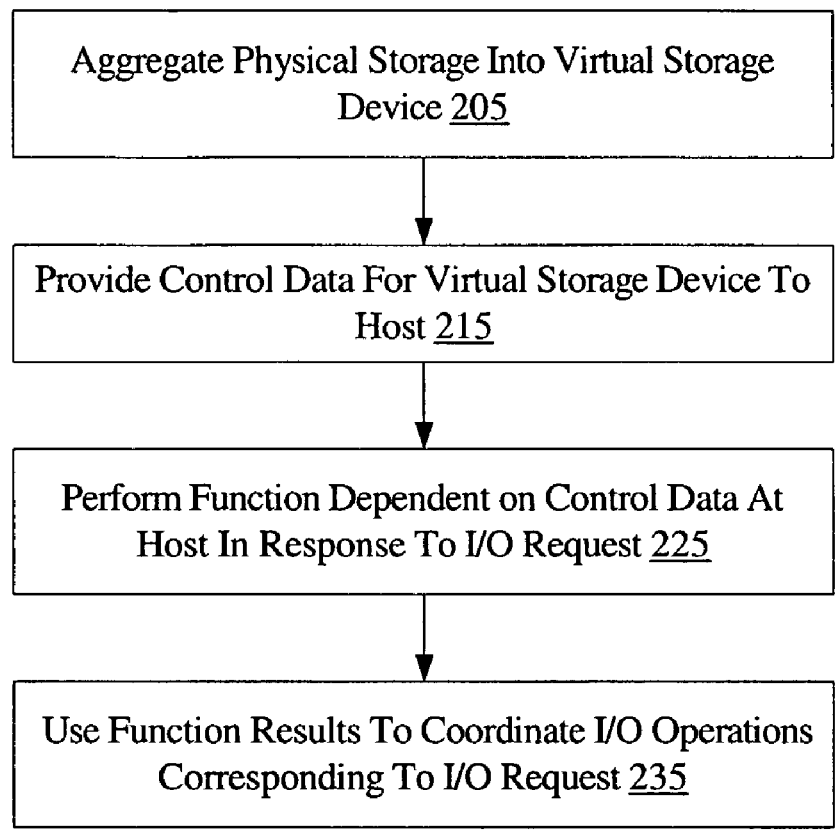
FIG. 2 is a flow diagram illustrating aspects of the operation of a system according to one embodiment, where an off-host virtualizer is configured to cooperate with a host.

FIG. 2 is a flow diagram illustrating aspects of the operation of system 100 according to one embodiment, where off-host virtualizer 130 is configured to cooperate with host 110 in the manner described above. Off-host virtualizer 130 may be configured to aggregate storage within one or more physical storage devices 160 into a virtual storage device such as a logical volume (block 205 of FIG. 2), and to provide control data related to the virtual storage device to a host 110 (block 215), e.g., to optimization driver 115 within the host. In response to an I/O request from a storage consumer, the host may be configured to perform a function dependent on the control data (block 225), and to use the results of the function to coordinate one or more I/O operations corresponding to the I/O request (block 235).

The content of the control data provided to optimization driver 115 may differ in different embodiments. In one embodiment, the control data may include the layout of the virtual storage device, including a description of the stripe geometry and the number of mirrors, and the mapping of stripes and/or mirrors to physical storage devices. Using the control data, the host (i.e., optimization driver 115 at the host) may detect that a single I/O request from a storage consumer may require access to multiple physical storage devices. For example, in one configuration of a striped virtual storage device, blocks numbered 0-999 of the virtual storage device may be stored as part of a first stripe on a first disk device, while blocks numbered 1000-1999 may be stored in a second stripe on a second disk device. If an I/O request from a storage consumer is directed to block 990 through block 1009, and the stripe geometry of the virtual storage device is provided to the host 110 by the off-host virtualizer 130, host 110 may be configured to detect that two physical I/Os may be required, one at each of the first and second disk devices. In some embodiments, the off-host virtualizer 130 may not provide efficient support for splitting an I/O request that spans multiple physical I/O devices and delivering the split requests to the physical I/O devices; for example, some virtualizing switches may have to serialize the split I/O requests rather than executing them in parallel. In contrast, if the host 110 splits up the spanning I/O request and sends the split requests to the off-host virtualizer 130, such that each I/O request received by the off-host virtualizer 130 requires access to a single physical I/O device, the off-host virtualizer 130 may be able to hand off the split requests to the physical storage devices more efficiently (e.g., in parallel).

Figure 3:
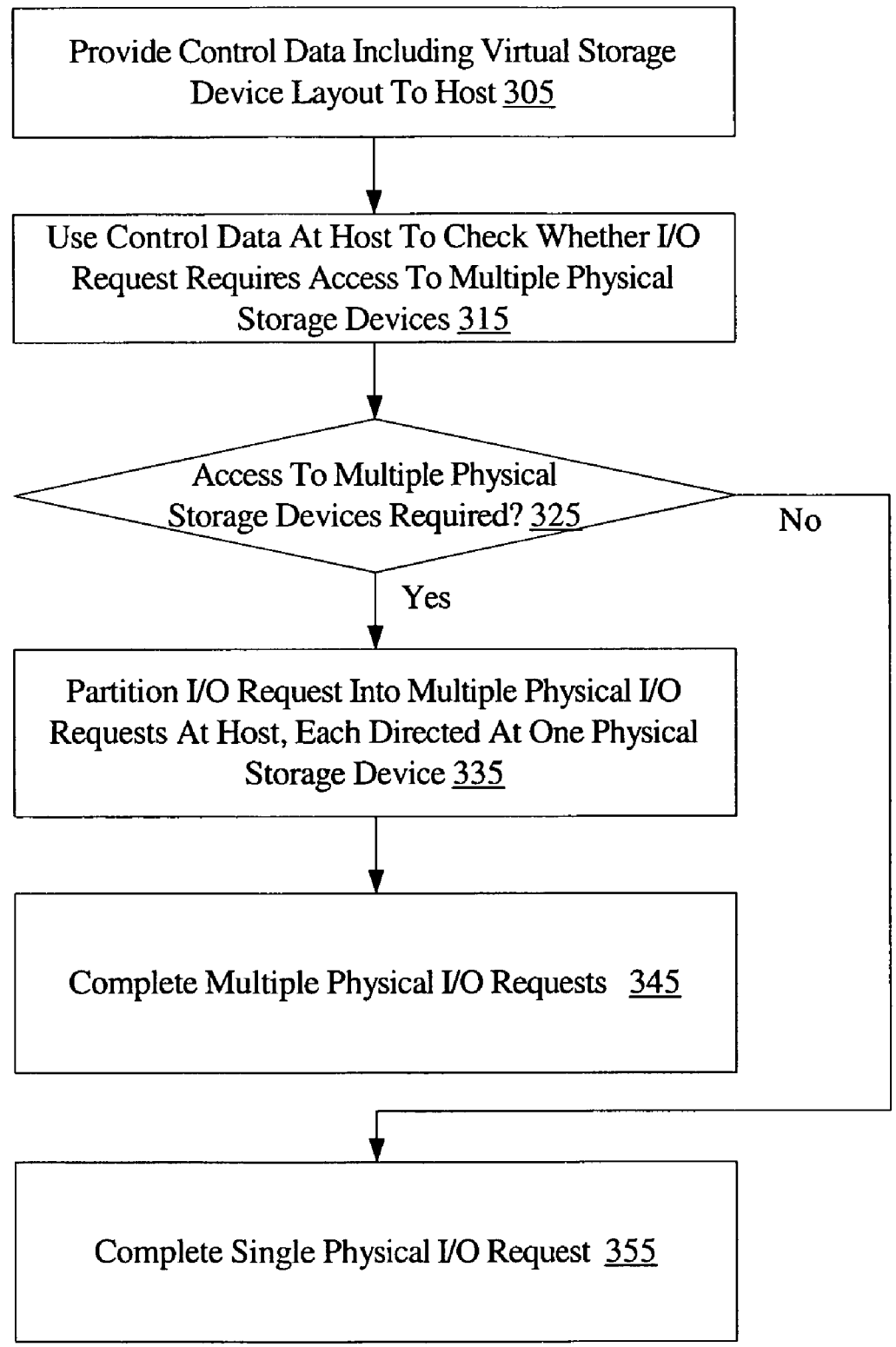
FIG. 3 is a flow diagram illustrating aspects of the operation of a system according to an embodiment in which a host is configured to use layout information to partition I/O requests spanning multiple physical storage devices.

FIG. 3 is a flow diagram illustrating aspects of the operation of system 100 according to one embodiment in which host 110 is configured to use layout information to partition I/O requests spanning multiple physical storage devices as described above. As shown in block 305 of FIG. 3, off-host virtualizer 130 may be configured to include the layout of virtual storage device 180 in the control data provided to host 110 (i.e., as part of the functionality corresponding to block 215 of FIG. 2). When host 110 receives an I/O request from a storage consumer, host 110 may use the layout information to check whether the I/O request spans multiple physical storage devices, i.e., whether access to multiple physical storage devices 160 will be required to satisfy the I/O request. If such access to multiple physical storage devices is required (as detected in decision block 325), host 110 may be configured to partition the I/O request into multiple physical I/O requests such that no partitioned I/O request spans more than one physical storage device (block 335). Host 110 may be configured to coordinate the completion of the multiple physical I/O requests (block 345). If host 110 detects that the I/O request from the storage consumer does not span multiple physical storage devices, no partitioning may be required and the host may coordinate the completion of a single physical I/O request (block 355).

In order to complete a response to the I/O request from the storage consumer, in one embodiment host 110 may be configured to pass on the physical I/O requests to off-host storage virtualizer 130, and to ensure that each physical I/O request has successfully completed before returning a response to the storage consumer. For example, in an embodiment where off-host virtualizer 130 is a virtualization switch, and the I/O request has been partitioned, host 110 may send each of the split or partitioned I/O requests to the virtualization switch. As none of the partitioned I/O requests may require access to more than one target physical storage device 160, the virtualization switch may be configured to hand off the multiple partitioned I/O requests to the physical storage devices in parallel, and to send completion indications or results to host 110 when the corresponding physical I/Os are complete. Host 110 may be configured to gather the results (which may include data blocks read in response to a read I/O request from the storage consumer), and to send a single I/O response to the storage consumer after consolidating the results corresponding to all the partitioned physical I/O requests. In other embodiments, for example where host 110 may be configured to access one or more physical storage devices 160 through a network path that does not include off-host virtualizer 130, host 110 may be configured to issue the partitioned physical I/O requests (and gather the results) without further interaction with off-host virtualizer 130.

In one embodiment, multiple paths from host 110 to a given physical storage device 160 backing a virtual storage device 180 may be available, with one path providing faster access, or utilizing fewer intermediate hops, than another. In such an embodiment, the control data provided to host 110 by off-host virtualizer 130 may include both volume layout information and network path information, allowing host 110 to make a selection of a preferred network path to be used to access a given block of data.

Figure 4:
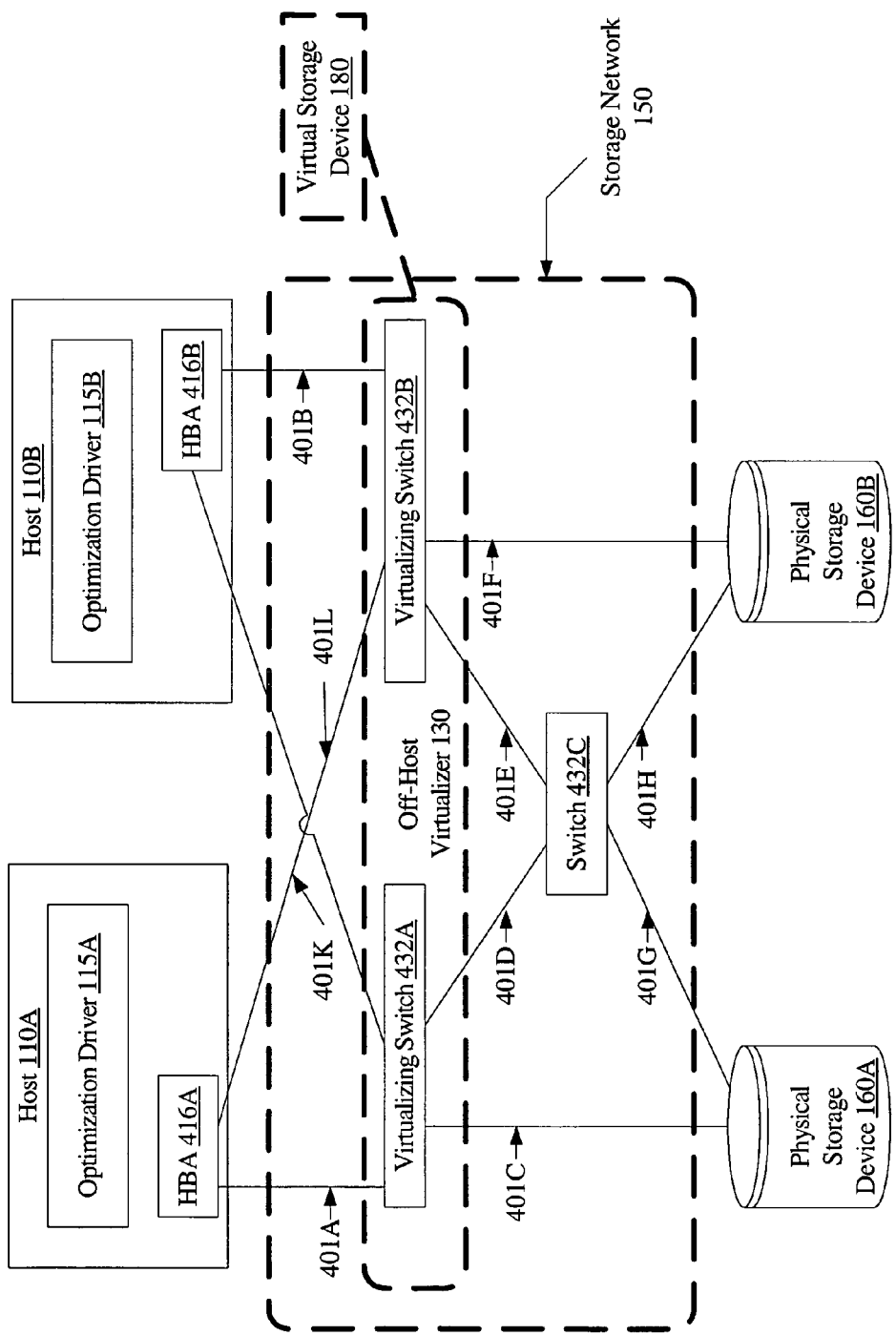
FIG. 4 is a block diagram illustrating an example of a storage network that includes multiple network paths between a host and a given physical storage device, according to one embodiment.

FIG. 4 is a block diagram illustrating an example of a storage network 150 that includes multiple network paths between hosts 110 and a given physical storage device 160, according to one embodiment. As depicted, host 110A may be linked to storage network 150 via a host bus adapter (HBA) 416A, and host 110B may be linked to storage network 150 via HBA 416B. Each host 110 (i.e., hosts 110A and 110B) may include a respective optimization driver 115—e.g., host 110A may include optimization driver 115A and host 110B may include optimization driver 115B. Storage network 150 may include a plurality of switches 432 (e.g., switches 432A, 432B, and 432C), including virtualizing switches 432A and 432B that collectively form an off-host virtualizer 130. A number of different links 401 (e.g., 401A, 401B, etc.) may connect HBA 416A, switches 432, and back-end physical storage devices 160, providing more than one path between host 110 and one or more physical storage devices 160. For example, various alternate paths may be available from host 110A to physical storage device 160A, such as a first path including links 401A and 401C, a second path including links 401A, 410D, and 401G, and a third path including links 401K, 401E and 401G. Similarly, a number of alternate paths may be available from host 110B to one or more physical storage devices 160.

As noted above, the control data for virtual storage device 180 provided to host 110 by off-host virtualizer 130 in embodiments such as those depicted in FIG. 4 may include layout information and network path information. When an I/O request from a storage consumer is received, the layout information may allow host 110 to identify the specific physical storage device or devices 160 at which a physical I/O operation corresponding to the I/O request may be required. The network path information, which may include a list of the alternate paths available to access the identified physical storage device, may allow host 110 to select a preferred network path including a preferred switch. That is, the control data-dependent function performed by host 110 may be a selection of a preferred network path. Host 110A may, for example, be able to choose between switches 432A and 432B when accessing a block at physical storage device 160A. In some embodiments, the host may be operable to select only the first device (such as switch 432A or 432B) along an I/O path, while one or more devices along the path may in turn be operable to select the remaining hops to the physical storage device. In other embodiments, hosts may be provided more complete I/O path information, allowing them to select additional hops, links or switches. It is noted that in the subsequent description, the term "switch" may be used generically to refer to virtualizing switches, as well as to non-virtualizing switches, i.e., to switches that are not configured to provide virtualization functionality.

Any of a number of different criteria may be used by optimization driver 115 at host 110 to select the preferred network path in different embodiments. For example, in one embodiment, the preferred network path may be selected based on the number of links or hops within the path: that is, optimization driver 115 may be configured to select the path with the fewest links 401 among the available paths. (If no single path contains fewer links than all other paths, any one of the paths with the fewest links may be selected.) In another embodiment, switches 432 may differ from one another in performance capabilities and/or functional characteristics, and host 115 may be provided specifications describing the differences between the switches 432. For example, switch 432B may be faster, or provide higher aggregate bandwidth, than switch 432A. In such embodiments, the criterion used by optimization driver 115 to select the preferred network path may include a selection of a preferred switch, based on the known performance capabilities and/or functional characteristics of the different switches 432.

For some I/O requests, as noted above, multiple physical I/O operations may be required (e.g., if virtual storage device 180 is a striped or mirrored device, a logical write request may require multiple physical write operations). In one embodiment, each physical I/O operation may require a selection of a preferred network path. After a preferred network path has been selected using the control data provided by off-host virtualizer 130, optimization driver 115 may be configured to generate a request for the physical I/O operation, and to route the physical I/O operation request via the preferred network path. When the physical I/O request or requests complete successfully, the optimization driver may be configured to receive the results, and to pass the data (for a read) or completion status (for a write) to the requesting storage consumer.

Figure 5:
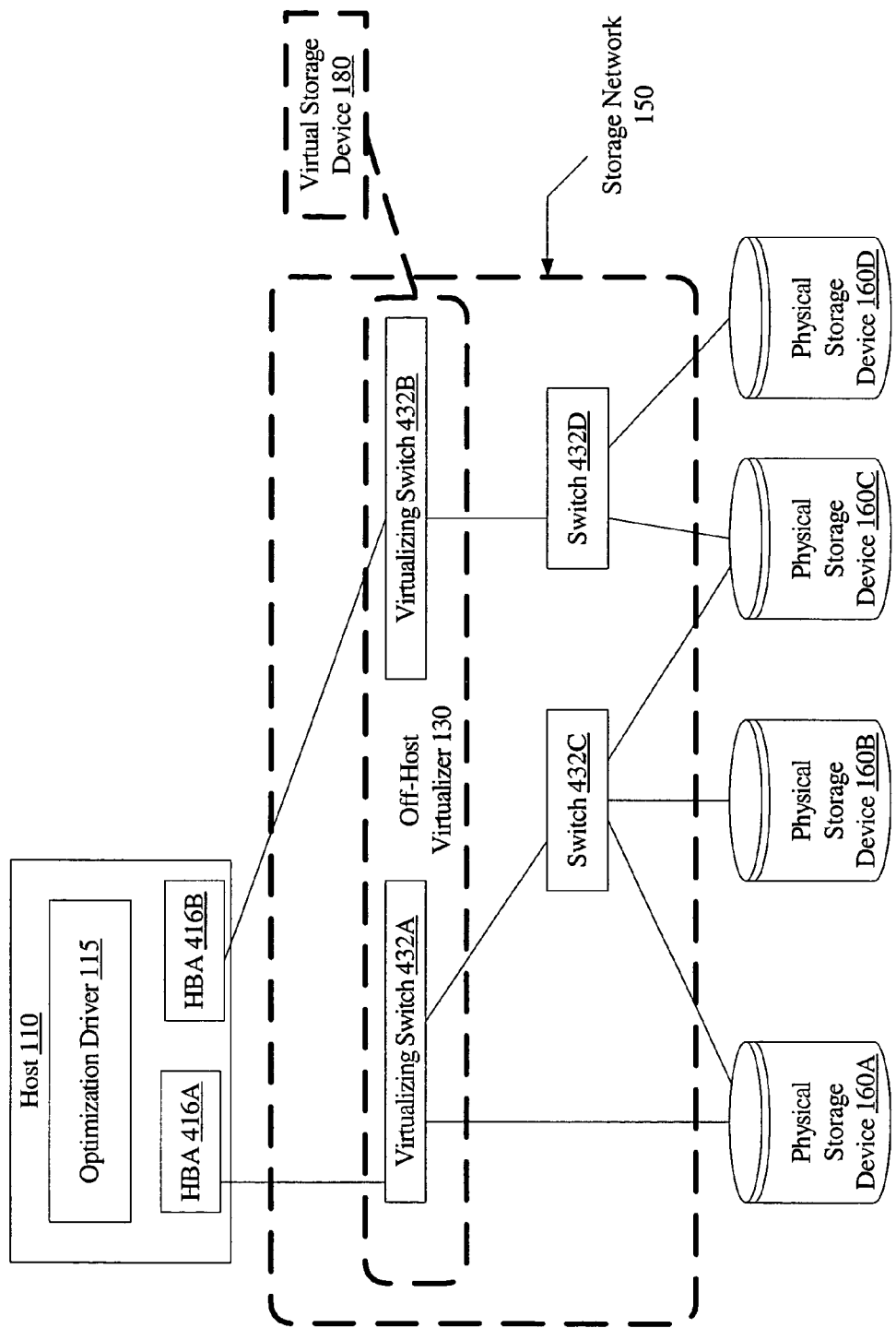
FIG. 5 is a block diagram illustrating an exemplary storage system configuration where a host includes a first host bus adapter (HBA) and a second HBA, according to one embodiment.

In some embodiments, the physical storage devices backing a given virtual storage device 180 may be accessible via more than one HBA: for example, a first subset of physical storage devices 160 may be accessible via a first HBA, and a second subset of physical storage devices 160 may be accessible via a second HBA. FIG. 5 is a block diagram illustrating an exemplary storage system configuration where host 110 includes a first HBA 416A and a second HBA 416B, according to one embodiment. In the illustrated embodiment, host 110 may access physical storage devices 160A-160C via HBA 416A, and physical storage devices 160C and 160D via HBA 416B. Virtual storage device 180 may be backed by physical storage devices 160A-160D. In such embodiments, the control data provided by off-host virtualizer 130 may include a mapping between HBAs and physical storage devices 160 (as well as layout information for the virtual storage device 180), allowing optimization driver 115 to select a preferred HBA to use in responding to an I/O request from a storage consumer. That is, the control data-dependent function performed by optimization driver 115 at host 110 may be a selection of a preferred HBA. In some embodiments, a preferred HBA may be selected from among two or more alternatives using criteria similar to those described earlier for selecting preferred switches or preferred network paths, e.g., performance or functional capabilities.

Figure 6:
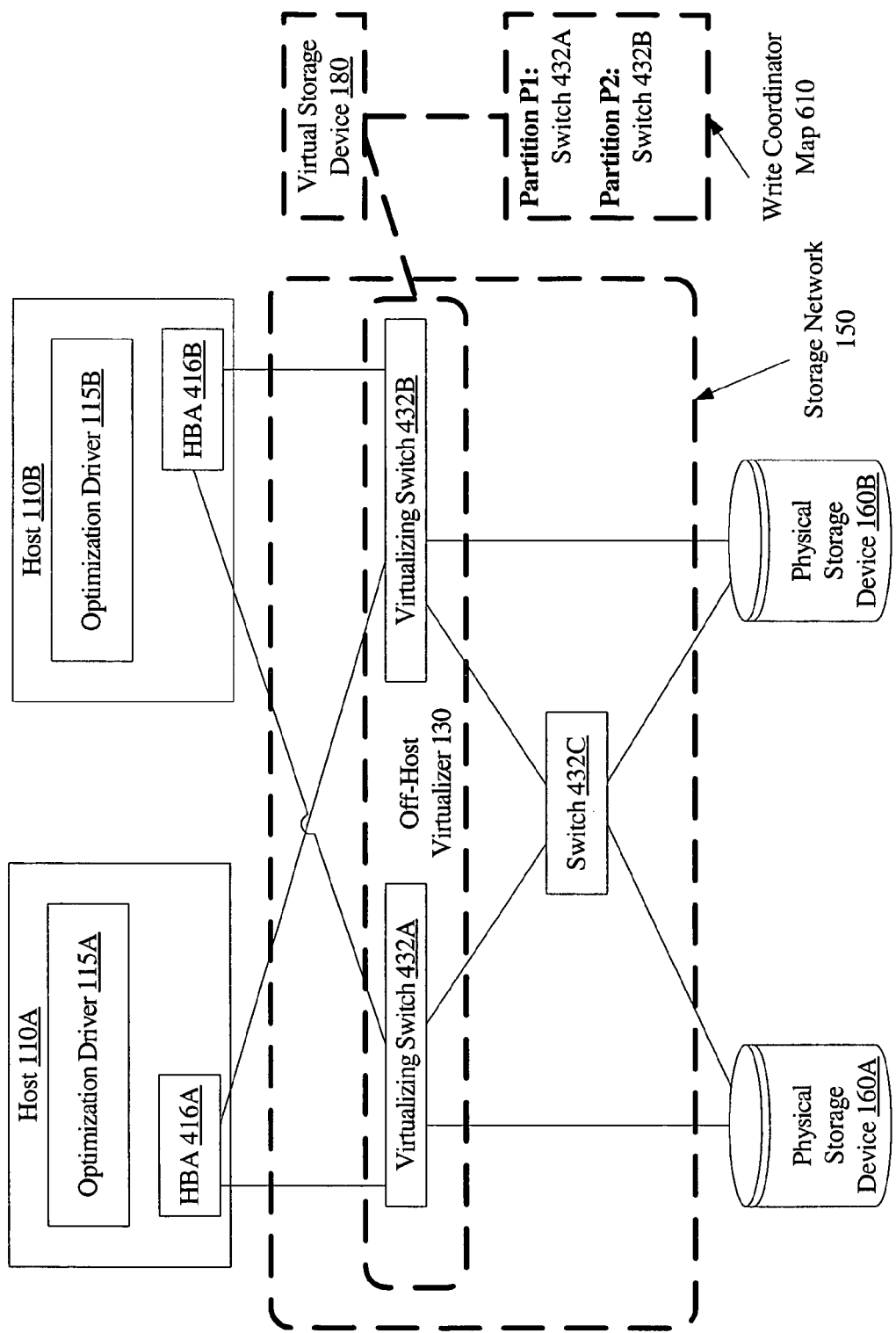
FIG. 6 is a block diagram illustrating an embodiment where an off-host virtualizer may be configured to divide the address space of virtual storage device into multiple partitions, and to designate a respective switch as a write coordinator for each partition.

In some embodiments where multiple switches 432 may be used to access a given physical storage device 160 backing virtual storage device 180, special handling for write operations may be implemented, especially in environments that support write-intensive applications. In such environments, read operations may be directed to any of the switches 432 that may have access to the targeted physical storage device 160. In contrast, for write operations, it may be desirable to divide the address space of the virtual storage device into one or more partitions, and to designate a different switch 432 as a "write coordinator" responsible for performing all write operations targeted at the partition. That is, all write operations targeted at a given partition may be directed to the switch 432 serving as the write coordinator for the partition. Such a technique may provide several advantages, such as improved write load balancing across switches 432, and a reduction in the amount of communication required for concurrency control (i.e., a reduction in the amount of locking-related network traffic that may be required when multiple concurrent storage consumers attempt to update a given data block). FIG. 6 is a block diagram illustrating an embodiment where off-host virtualizer 130 may be configured to divide the address space of virtual storage device 180 into two partitions P1 and P2, and to designate a respective switch as a write coordinator for each partition (switch 432A for partition P1, and switch 432B for partition P2).

The address range of virtual storage device 180 may be divided into partitions for write coordination using a variety of techniques. In one embodiment, a modulo technique may be employed: that is, logically successive ranges of blocks of virtual storage device 180 may be placed in successive partitions. For example, blocks 0-4999 may be placed in partition P1, blocks 5000-9999 in partition P2, blocks 10000-14999 in partition P1, etc. In another embodiment, the address space of virtual storage device 180 may simply be divided into N consecutive sub-ranges for distribution among N partitions: e.g., if virtual storage device 180 comprises blocks numbered 0-99999, and N=2, blocks 0-49999 may be placed in partition P1, and blocks 50000-99999 in partition P2. In general, any number of partitions of the virtual address space may be created and distributed among different switches 432 for write coordination as desired.

The control data provided by off-host virtualizer 130 to optimization driver 115 in such embodiments may include the write coordinator map 610 identifying different partitions and associated write coordinators. When a write request is received from a storage consumer, optimization driver 115 may use the write coordinator map 510 to identify the appropriate switch 432 to which a corresponding physical write request may be directed. Thus, the control data-dependent function performed by a host 110 in such embodiments may include the selection of a target write coordinator. As write requests targeted at different blocks of the address space of virtual storage device 180 are received, optimization driver 115 may distribute them to the appropriate write coordinator switches, thereby distributing the write workload across the switches. In some embodiments, the write coordinators may also be configured to implement mirrored writes without requiring a host 110 to generate multiple write requests. That is, if a virtual storage device 180 includes multiple mirrors, a single request to update a given block may be generated by optimization driver 115 and sent to the appropriate write coordinator switch 432; the write coordinator may then generate physical write operations for all the mirrors. Multiple hosts 110, such as hosts 110A and 110B, may be provided the write coordinator map 610, and each of the hosts 110 may be configured to direct write operations to the appropriate write coordinator switch 432; that is, writes to a particular partition that may have originated at any of the multiple hosts 110 may be directed to the same write coordinator switch 432 in some embodiments.

When multiple concurrent write requests directed at a given block or overlapping range of blocks of virtual storage device 180 are received by a host 110, all such write requests may be directed to a single write coordinator. The write coordinator may then serialize the corresponding physical write operations, thereby ensuring that concurrent write operations do not overwrite each other's data or otherwise cause data corruption. Since each block of virtual storage device 180 may be associated with only one write coordinator switch 432, no locking-related messages (e.g., distributed locks) may need to be exchanged between different write coordinators to provide concurrency control using this technique. For certain long-lasting atomic operations (such as a mirror recovery operation that may require a large number of writes to be completed), in one embodiment a special interface may be implemented to allow write coordinator switches 432 to hold a lock on a given block until the entire long-lasting atomic operation completes. It is noted that while the technique of employing write coordinators has been described above in the context of storage environments employing switches 432, in other embodiments devices other than switches, such as additional hosts, intelligent disk array devices, or intelligent storage appliances, may also be used as write coordinators.

In some embodiments, a host 110 and off-host virtualizer 130 may be configured to cooperate to provide additional virtualization functions, such as enhanced error recovery capabilities. As noted above, in one embodiment where off-host virtualizer 130 includes a virtualizing switch 432, the switch 432 may be designed to pass on I/O requests to back-end physical storage devices 160 as soon as possible after the I/O request is received, and to pass the results of I/O operations back to the requesting front-end client or host 110 as soon as the results become available from the physical storage device. That is, the switch 432 may typically not be configured to store the data corresponding to an I/O request (e.g., the data blocks written or read). In such environments, cooperation between the off-host virtualizer 130 and host 110 may allow an improved response to certain kinds of failures and/or errors, such as read errors at mirrored virtual storage devices and network path errors.

In one embodiment, where the virtual storage device 180 is a mirrored logical volume including two or more mirrors (i.e., where two or more copies of the data of the logical volume may be stored at separate physical storage devices 160), the off-host virtualizer 130 may be configured to send a particular error code to host 110 upon the detection of a read error at a first mirror. The particular error may indicate that an alternate redundant copy of the targeted data blocks (i.e., the blocks of volume 180 intended to be read) is available at the second mirror. The host 110 may be configured to send a second read request directed at the second mirror upon receiving the particular error code, instead of, for example, passing an error indication on to a requesting storage consumer. In another embodiment, the particular error code may simply indicate that the read error occurred at a mirrored logical volume, without specifying that an alternate copy is available, or which physical storage devices 160 include the alternate copy. In such an embodiment, the host 110 may be configured to send a query to the off-host virtualizer 130 upon receiving the particular error code, requesting an indication that an alternate copy of the targeted data blocks is available. In response to the query, the off-host virtualizer 130 may be configured to verify that a redundant alternate copy of the data blocks is available and accessible by the host 110, e.g., at the second mirror. The off-host virtualizer 130 may then send a response to the query, e.g., including an identification the second mirror, and the host 110 may send a request to read the redundant copy.

A similar technique may be used in the presence of network path failures in embodiments where redundant paths may be available to the same physical storage device 160. For example, if a network link 401 between a switch 432 and a physical storage device 160 fails, preventing a successful completion of a physical I/O request, in one embodiment switch 432 may be configured to send a particular error code to host 110. The particular error code may identify the nature of the error, as well as the specific link 401 that failed, or a set of links 401 that were part of the network path on which the write operation was sent. In response to receiving the particular error code, in one embodiment, host 110 may be configured to select an alternative network path, and re-issue the I/O request along the selected alternative network path, instead of passing an error indication on to a requesting storage consumer. In another embodiment, the particular error code may simply indicate that a network path error has occurred, and the host 110 may be configured to send a query to off-host virtualizer 110 requesting an indication of an alternate network path, if such a path exists and is functioning. The off-host virtualizer 130 may send a response to the query including an identification of one or more alternate paths, and the host 110 may then re-issue the request using one of the specified alternate paths. In one embodiment, the error recovery operation for a write operation may include the host simply re-issuing or retrying the failed write request up to a specified number of times, allowing the switch 432 to attempt the write operation again, e.g., over alternate paths. It is noted that while some traditional host-based disk drivers may also be configured to attempt up to a fixed number of retries for failed operations, the disk drivers may often be unaware of the number of mirrors or alternate paths that may be currently available. If for example, the traditional disk driver is configured to retry an I/O up to two times, but there are three or more alternate mirrors or three or more alternate paths to the data, the number of retries attempted by the disk driver may be insufficient to complete the I/O (e.g., the disk driver may stop attempting retries after two attempts, even though a third attempt may have succeeded). In contrast, the error code (or other control data) provided to optimization driver 115 by off-host virtualizer 130 may allow the host to overcome the kinds of restrictions typically found in traditional disk drivers, e.g., by allowing the host to retry the I/O based on the current number of alternative paths or mirrors available.

Figure 7:
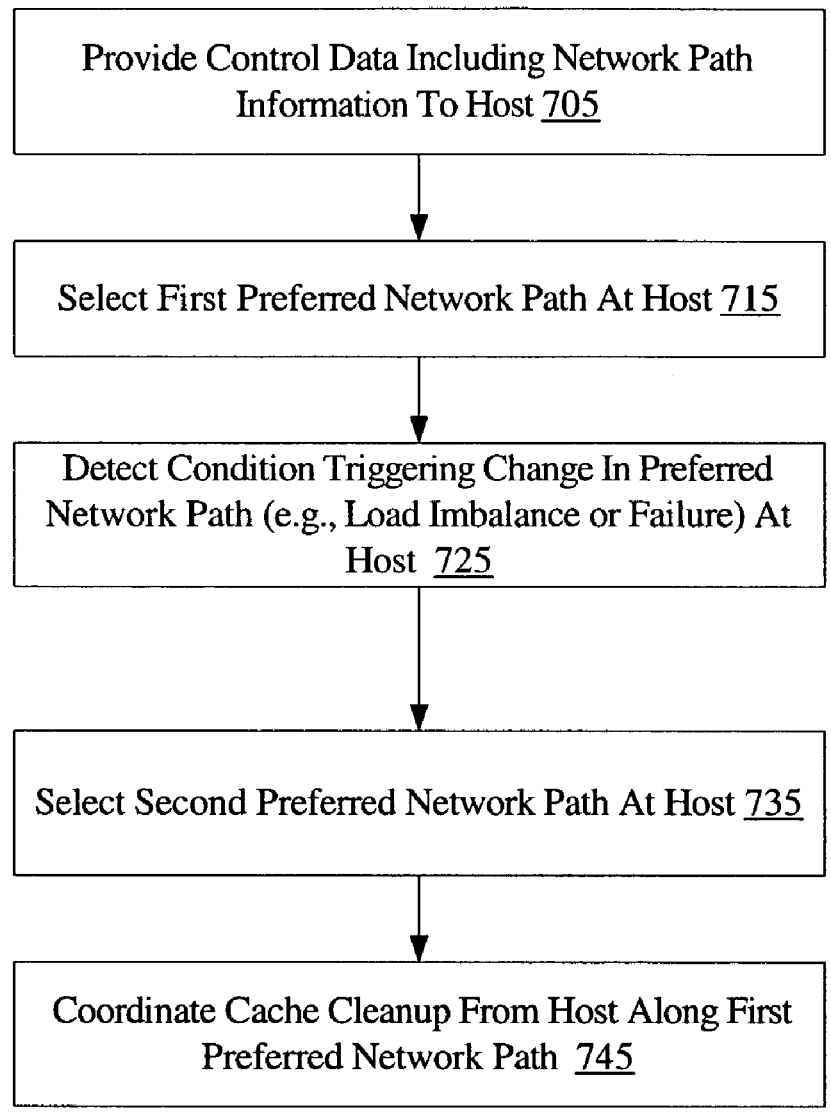
FIG. 7 is a flow diagram illustrating aspects of the operation of a system according to one embodiment, where multiple paths are available between a host and a physical storage device, and the host is configured to switch from using a first network path to the physical storage device to using a second network path.

The technique of selecting a second or alternative network path (using control data provided by off-host virtualizer 130) to perform a desired I/O operation in response to a detection of a failure, may also be applied in response to other triggering conditions in other embodiments. FIG. 7 is a flow diagram illustrating aspects of the operation of system 100 according to one embodiment, where multiple paths are available between a host 110 and a physical storage device 160, and the host is configured to switch from using a first network path to the physical storage device to using a second network path. As shown in block 705, off-host virtualizer 130 may be configured to provide control data on virtual storage device 180 to host 110, including network path information indicating the multiple paths allowing access to a given physical storage device 160. Using the control data, host 110 may select a first preferred network path (block 715), for example using one of the selection criteria described above, such as a minimum number of hops or links 401. I/O operations may then be performed using the first preferred network path, until a condition triggering a change to a second network path is detected by the host (block 725).

The triggering condition may differ in different embodiments: for example, in one embodiment, only an error or a failure may trigger a change in the preferred network path, while in another embodiment, a load imbalance may also trigger the change. An indication of a load imbalance may be detected using any suitable technique, e.g., using statistics periodically collected from one or more switches 432, or using sniffers or other devices to measure traffic along links 401. The criteria used to determine whether load has become unbalanced, and algorithms to select a particular alternate network path to use if multiple alternate paths are available, may be specified as part of a load balance policy implemented within system 100. Various implementation details related to load balancing, such as the metrics used to measure load, and the amount by which load over one network path or switch has to differ from the load over an alternate path for a load imbalance to be detected, etc., may be included in the load balance policy in different embodiments. Once the triggering condition has been detected, the host may switch to a second preferred network path (block 735) for I/Os directed at the physical storage device 160. In one embodiment, host 110 may also be configured to send an indication (e.g., via an out-of-band message, or as a parameter or flag associated with an I/O request) of the second preferred network path to off-host virtualizer 130, and off-host virtualizer 130 may be configured to use the second preferred network path in subsequent I/O operations directed at the physical storage device 160.

Figure 8:
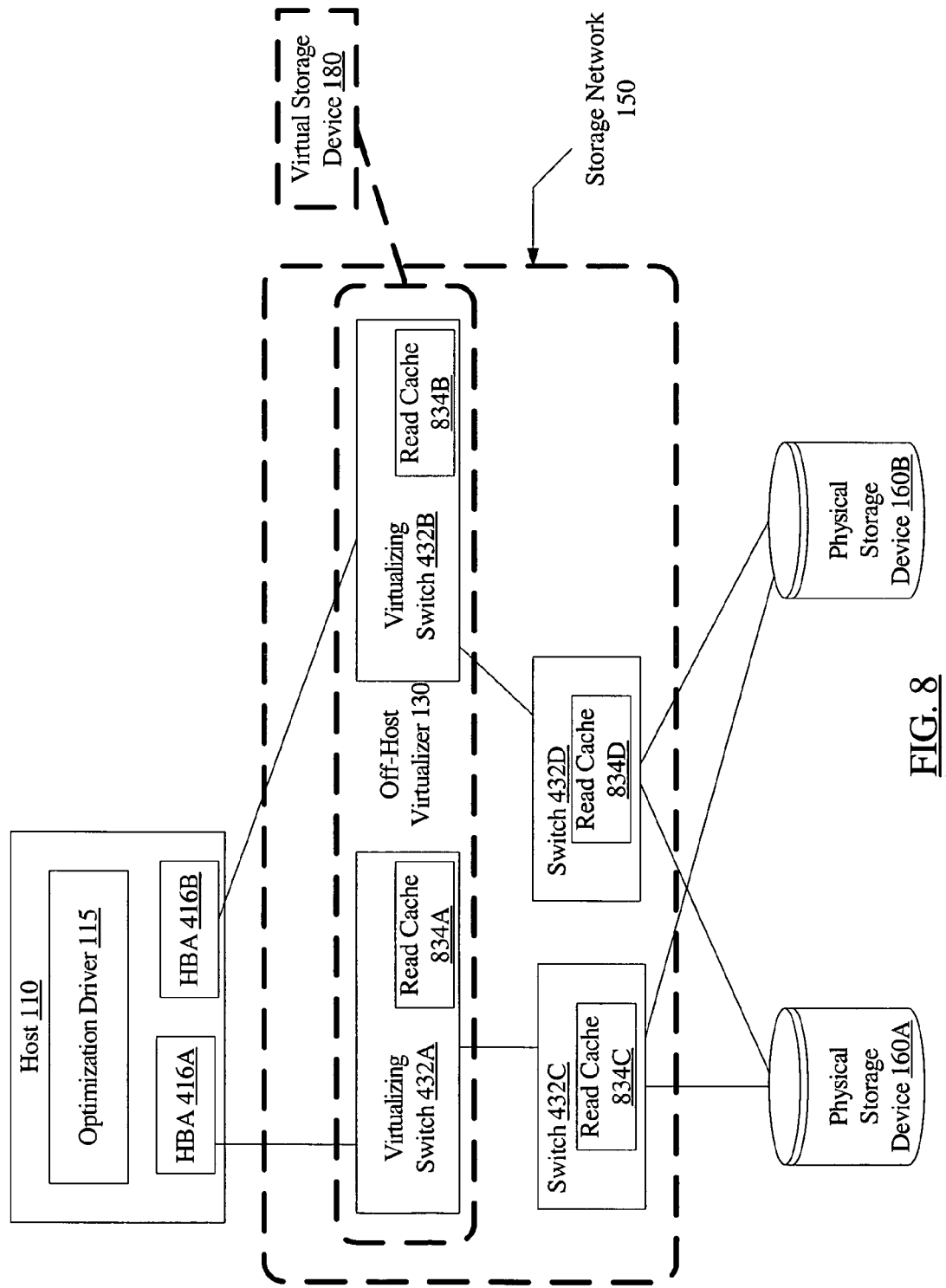
FIG. 8 is a block diagram illustrating one embodiment where a plurality of switches in a storage network include respective read caches.

In one embodiment, a transition from using one network path to another may require cache cleanup at one or more switches 432. FIG. 8 is a block diagram illustrating one embodiment where each switch 432 in storage network 150 includes a respective read cache 834—e.g., switch 432A includes read cache 834A, switch 432B includes read cache 834B, etc. Any given read cache 834 may be used to store data read over a network path including the corresponding switch 432. For example, if a block B of a virtual storage device is read from physical storage device 160A over a network path including switches 432A and 432C, a copy of block B may be stored in cache 834A and/or cache 834C, with a goal of reducing the latency required to access block B if it is later re-read. In embodiments employing read caches in this manner, a change to a second network path may potentially result in stale data being read. For example, if block B is initially cached at read cache 834C, and if host 110 chooses a second network path including switches 432B and 432D as a preferred network path because of a load imbalance, the copy of data block B that is cached at read cache 834C may become out-of-date or stale if block B is updated after the change of preferred network path. If, later, cache 834C becomes part of a preferred network path again (e.g., if a second change in network path is triggered by a second load imbalance or by a failure), and block B remains within cache 834C, the stale version may inadvertently be returned to a storage consumer. In such embodiments, as shown in block 745 of FIG. 7, host 110 may be configured to coordinate a cache cleanup along the initial network path. E.g., in FIG. 8, when host 110 changes the preferred network path from a first path including switches 432A and 432C to physical storage device 160A to a second path including switches 432B and 432D, host 110 may issue one or more cache invalidation requests to switches 432A and 432C, so that blocks of data of physical storage device 160A may be invalidated in, or purged from, caches 834A and 834C. In one embodiment, the cache invalidation requests may be sent over a network other than storage network 150, e.g., over an IP (Internet Protocol) network to which host 110 and switches 432 may be linked. It is noted that in some embodiments, not all switches 432 of the storage network 150 may include read caches, so that cache cleanup may not be required at all switches on a particular network path.

Figure 9:
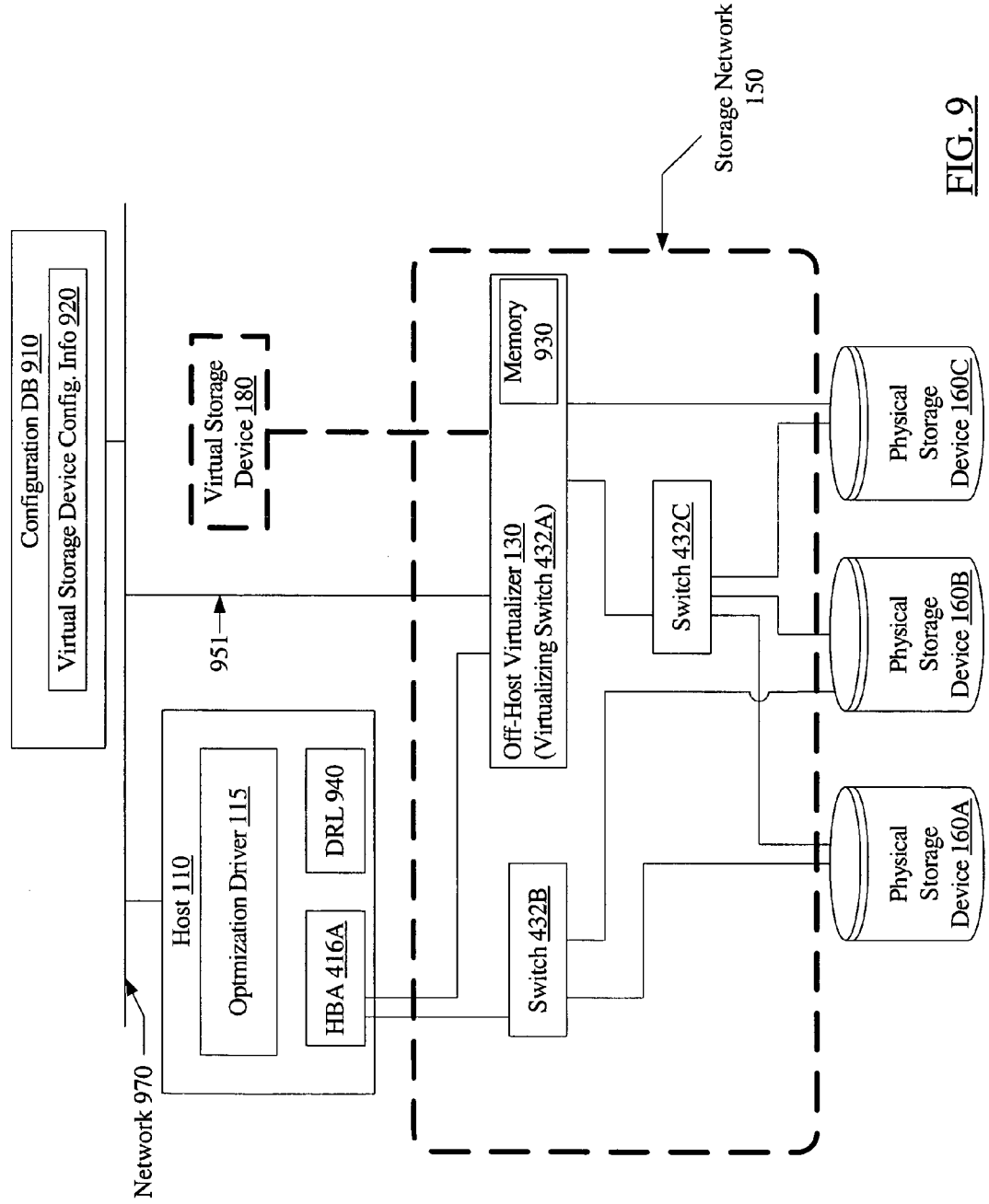
FIG. 9 is a block diagram illustrating an embodiment where configuration information for a virtual storage device is maintained in an external configuration database.

In other embodiments, host 110 may be configured to perform additional functions to assist off-host virtualizer 130 in responding to I/O requests from storage consumers. FIG. 9 is a block diagram illustrating an embodiment where configuration information 920 for virtual storage device 180 is maintained in an external configuration database 910. In the illustrated embodiment, configuration information required to perform physical I/O operations, such as volume layout information, may be stored outside off-host virtualizer 130 (which may comprise a single switch 432A), for example because of limited memory space available at memory 930 at the off-host virtualizer. The control data provided to host 110 by off-host virtualizer 180 may include an identification of the configuration database 910 and the virtual storage device 180, allowing host 110 to communicate with configuration database 910. In such an embodiment, the function performed by host 110 (corresponding to block 225 of FIG. 2) may include a loading a portion of the configuration information 920 into memory 930 at off-host virtualizer 130. That is, in response to receiving an I/O request from a storage consumer, host 110 may be configured to ensure that configuration information needed to perform the physical I/O corresponding to the I/O request is loaded at off-host virtualizer 130, e.g., over a network link 951. Configuration database 910 may be maintained at a separate host in some embodiments, and/or may be incorporated within host 110 in other embodiments.

In one specific embodiment, host 110 may also be configured to maintain a "Dirty Region Log" or DRL 940 associated with a virtual storage device 180. Dirty region logging is a technique that may be used to reduce the amount of time taken to resynchronize the mirrors of a mirrored virtual storage device, e.g., after a failure that leaves the mirrors inconsistent with each other. In embodiments where virtual storage device 180 comprises one or more mirrors, the address space of the virtual storage device may be logically divided into a number of regions. Before a write is performed to a block of the virtual storage device, the region corresponding to the block may be marked "dirty" in the DRL. If the mirrors become inconsistent, only those regions that are marked dirty in the DRL may be copied from one designated source mirror to the remaining mirrors, instead of copying the entire virtual storage device. Control data on the layout of the virtual storage device provided by off-host virtualizer 130 to host 110 may allow host 110 to construct the DRL, e.g., as a bitmap with one bit representing each region. By maintaining and updating the DRL at host 110 instead of at the off-host virtualizer itself, the tasks required from off-host virtualizer 130 for a write operation to a mirrored virtual storage device 180 may be simplified, e.g., off-host virtualizer 130 may not need to block or enqueue physical write operations while the DRL is updated. In such embodiments, the control data-dependent function performed at host 110 may be an update of the DRL. While the embodiment illustrated in FIG. 9 includes a DRL 940 and a configuration database 910, it is noted that these two features may be implemented independently of one another: i.e., in general, embodiments including a configuration database 910 need not include a DRL 940, and embodiments including a DRL 940 need not include a configuration database 910.

It is noted that while the embodiments described above have included a single virtual storage device 180, in other embodiments, multiple virtual storage devices may be used. In such embodiments, off-host virtualizer 130 may be configured to aggregate storage from physical storage devices 160 into a plurality of virtual storage devices 180. Further, control data for one or more of the aggregated virtual storage devices 180 may be provided to more than one host, either symmetrically, where each host gets the same control data, or asymmetrically, where different hosts are provided different sets of control data. A host 110 may be any desired computer system capable of executing optimization driver 115, including one or more processors, one or more memories, peripheral devices such as monitors, keyboards, mice, and I/O interfaces such as network adapters, disk adapters and the like. A host 110 may also include locally-attached physical storage devices such as disks. A storage consumer may be any type of application or device that requires data access, such as a file system or an application. A storage consumer may be incorporated within host 110 in one embodiment, while in other embodiments the storage consumer may be executed at a remote device or a client computer system other than host 110, and may interact with host 110 over a network such as a local area network (LAN) or wide area network (WAN). In additional embodiments, a storage consumer may be an embedded system configured to use application specific integrated circuit (ASIC) or field-programmable gate array (FPGA) technology to execute operations whereby a given storage device may be accessed.

Storage network 150 may be implemented using any suitable technology capable of supporting the functionality described above, such as Fibre Channel, Internet SCSI, and the like. Off-host virtualizer 130 may be implemented using any desired device, such as a virtualizing switch, a virtualization appliance, or additional hosts configured to provide virtualization functionality. A virtualizing switch may be an intelligent fiber channel switch, configured with sufficient processing capacity to perform desired virtualization operations in addition to supporting fiber channel connectivity. A virtualization appliance may be an intelligent device programmed to perform virtualization functions, such as providing mirroring, striping, snapshot capabilities, etc. Appliances may differ from general purpose computers in that their software is normally customized for the function they perform, pre-loaded by the vendor, and not alterable by the user. In some embodiments, multiple devices or systems may cooperate to provide off-host virtualization; e.g., multiple cooperating virtualization switches and/or virtualization appliances may form a single off-host virtualizer 130. Numerous other configurations of off-host virtualizers 130, storage network 150, and hosts 110 are possible and contemplated.

Figure 10:
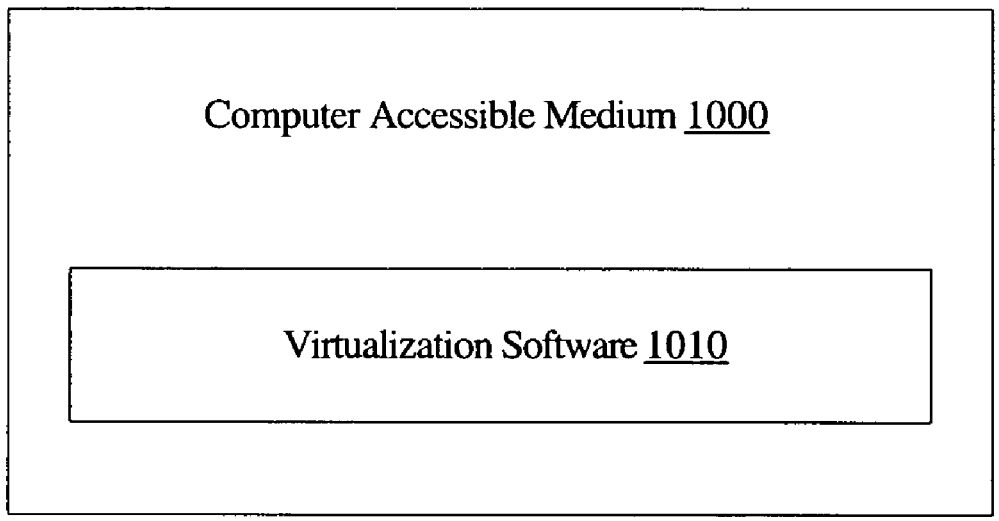
FIG. 10 is a block diagram illustrating an embodiment of a computer accessible medium.

FIG. 10 is a block diagram illustrating one embodiment of a computer accessible medium 1000 comprising virtualization software 1010 capable of providing the functionality of off-host virtualizer 130 and host 110 described above. In different embodiments, virtualization software 1010 may be provided to a computer system using a variety of computer-accessible media including electronic media (e.g., flash memory), magnetic media such as RAM (e.g., SDRAM, RDRAM, SRAM, etc.), optical storage media such as CD-ROM, etc., as well as transmission media or signals such as electrical, electromagnetic or digital signals, conveyed via a communication medium such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
    a host;
    two or more physical storage devices; and
    an off-host virtualizer;
wherein the off-host virtualizer is configured to:
    aggregate storage within the two or more physical storage devices into a virtual storage device, wherein the two or more physical storage devices include a first and a second physical storage device; and provide control data for the virtual storage device to the host, wherein the control data identifies specific locations in the two or more physical storage devices that are mapped to logical blocks of the virtual storage device;

wherein the host is configured to:

in response to an I/O request targeted at the virtual storage device, determine that the I/O request requires access to the first physical storage device and the second physical storage device using the control data;

partition the I/O request into a first physical I/O request targeted at the first physical storage device and a second physical I/O request targeted at the second physical storage device; and transmit the first physical I/O request and the second physical I/O request to the off-host virtualizer.

2. The system as recited in claim 1, wherein the off-host virtualizer includes a virtualizing switch.

3. The system as recited in claim 1, wherein the control data includes network path information.

4. The system as recited in claim 3, wherein the host is further configured to select a first preferred network path to access the first physical storage device of the two or more physical storage devices.

5. The system as recited in claim 4, further comprising two or more host bus adapters, wherein the first preferred network path includes a preferred host bus adapter of the two or more host bus adapters.

6. The system as recited in claim 4, further comprising two or more switches, wherein the first preferred network path includes a preferred switch of the two or more switches.

7. The system as recited in claim 4, wherein the host is further configured to select a second preferred network path to access the first physical storage device upon a detection of a triggering condition.

8. The system as recited in claim 7, wherein the triggering condition is a load imbalance detected in accordance with a load balancing policy.

9. The system as recited in claim 7, wherein the triggering condition is a path failure.

10. The system as recited in claim 7, wherein the first preferred network path includes a switch with a cache, and wherein, upon the selection of the second preferred network path, the host is further configured to coordinate a cache cleanup at the switch.

11. The system as recited in claim 7, wherein the triggering condition is a reception of a particular error code from the off-host virtualizer, wherein the particular error code includes an indication of an availability of the second preferred network path to the first physical storage device upon a detection of a failure along the first preferred network path.

12. The system as recited in claim 11, wherein, in response to the reception of the particular error code, the host is further configured to generate one or more retry attempts to access the first physical storage device.

13. The system as recited in claim 7, wherein the off-host virtualizer is further configured to:

send a particular error code to the host upon a detection of a failure along the first preferred network path during an I/O operation targeted at the first physical storage device;

wherein the host is further configured to:

send a query to the off-host virtualizer requesting an indication of an existence of an alternate network path to the first physical storage device;

wherein the off-host virtualizer is further configured to:

respond to the query by sending a reply to the host indicating that the first physical storage device is accessible via the second preferred network path;

and wherein the triggering condition is a reception of the reply by the host.

14. The system as recited in claim 1, wherein the virtual storage device is a mirrored logical volume including a first and a second mirror, wherein the off-host virtualizer is further configured to:

send a particular error code to the host upon a detection of a read error in response to a first read request targeted at the first mirror;

wherein the host is further configured to:

issue a second read request targeted at the second mirror in response to a reception of the particular error code.

15. The system as recited in claim 1, wherein the virtual storage device is a mirrored logical volume including a first and a second mirror, wherein the off-host virtualizer is further configured to:

send a particular error code to the host upon a detection of a read error in response to a first read request targeted at a first block of the first mirror;

wherein the host is further configured to:

send a query to the off-host virtualizer requesting an indication of an existence of an alternate redundant copy of the first data block in response to a reception of the particular error code;

wherein the off-host virtualizer is further configured to:

respond to the query by sending a reply to the host indicating that the second mirror contains an alternate redundant copy of the first data block;

and wherein the host is further configured to:

issue a second read request targeted at the alternate redundant copy at the second mirror in response to a reception of the reply.

16. The system as recited in claim 1, wherein a network path to the two or more physical storage devices comprises a first and a second switch, wherein the I/O request is a write request, and wherein the off-host virtualizer is further configured to:

divide a virtual address space of the virtual storage device into a first partition and a second partition;

designate the first switch as a first write coordinator to coordinate write operations for the first partition, and the second switch as a second write coordinator to coordinate write operations for the second partition;

wherein the control data includes an identification of the first and second write coordinators and the corresponding partitions; and wherein the host is further configured to select a target write coordinator corresponding to the write request and a transmission of the write request to the target write coordinator.

17. The system as recited in claim 1, wherein the host is further configured to load configuration information associated with the virtual storage device at the off-host virtualizer.

18. The system as recited in claim 1, wherein the host is further configured to update a dirty region log (DRL).

19. A method comprising:

aggregating storage within two or more physical storage devices into a virtual storage device at an off-host virtualizer, wherein the two or more physical storage devices include a first and a second physical storage device;

providing control data for the virtual storage device to a host, wherein the control data identifies specific locations in the two or more physical storage devices that are mapped to logical blocks of the virtual storage device;

in response to an I/O request targeted at the virtual storage device, determining that the I/O request requires access to the first physical storage device and the second physical storage device at the host using the control data;

partitioning the I/O request into a first physical I/O request targeted at the first physical storage device and a second physical I/O request targeted at the second physical storage device at the host; and transmitting the first physical I/O request and the second physical I/O request to the off-host virtualizer at the host.

20. The method as recited in claim 19, wherein the control data includes network path information.

21. The method as recited in claim 20, further comprising selecting a first preferred network path to access a first physical storage device of the two or more physical storage devices at the host.

22. The method as recited in claim 21, further comprising:
selecting a second preferred network path to access the first physical storage device upon a detection of a triggering condition.

23. The method as recited in claim 22, wherein the triggering condition is a load imbalance detected in accordance with a load balancing policy.

24. The method as recited in claim 22, wherein the triggering condition is a path failure.

25. A computer accessible storage medium comprising program instructions, wherein the instructions are executable to:
aggregate storage within two or more physical storage devices into a virtual storage device at an off-host virtualizer, wherein the two or more physical storage devices include a first and a second physical storage device;
provide control data for the virtual storage device to a host, wherein the control data identifies specific locations in the two or more physical storage devices that are mapped to logical blocks of the virtual storage device;

in response to an I/O request targeted at the virtual storage device determine that the I/O request requires access to the first physical storage device and the second physical storage device at the host using the control data;

partition the I/O request into a first physical I/O request targeted at the first physical storage device and a second physical I/O request targeted at the second physical storage device at the host; and transmit the first physical I/O request and the second physical I/O request to the off-host virtualizer at the host.

26. The computer accessible storage medium as recited in claim 25, wherein the control data includes network path information.

27. The computer accessible storage medium as recited in claim 26, wherein the program instructions are further executable to select a first preferred network path to access a first physical storage device of the one or more physical storage devices.

28. The computer accessible storage medium as recited in claim 27, wherein the instructions are further executable to:
select a second preferred network path to access the first physical storage device upon a detection of a triggering condition.

29. The system as recited in claim 1, wherein the control data comprise information regarding specific access to at least one of the one or more physical storage devices aggregated into the virtual storage device.

30. The system as recited in claim 29, wherein the information regarding specific access to at least one of the one or more physical storage devices comprises one or more of:
network path information for the at least one of the one or more physical storage devices; or
layout information regarding the one or more physical storage devices in the virtual storage device.

* * * * *